(12) United States Patent
Wang et al.

(10) Patent No.: US 6,251,473 B1
(45) Date of Patent: Jun. 26, 2001

(54) PREPARATION OF CERAMIC THIN FILMS BY SPRAY COATING

(75) Inventors: Conghua Wang, Wayne; Wayne L. Worrell, Narberth, both of PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 09/310,432

(22) Filed: May 12, 1999

(51) Int. Cl.[7] .................................................... B05D 5/12
(52) U.S. Cl. ...................... 427/126.3; 427/115; 427/421; 427/453
(58) Field of Search ................................. 427/115, 126.3, 427/453; 204/421

(56) References Cited

U.S. PATENT DOCUMENTS

| 4,609,562 | 9/1986 | Isenberg et al. . |
| 5,085,742 | 2/1992 | Dollard et al. . |
| 5,145,720 | 9/1992 | Hirai et al. . |
| 5,332,598 | * 7/1994 | Kawasaki et al. .................... 427/453 |
| 5,358,735 | 10/1994 | Kawasaki et al. . |
| 5,368,667 | 11/1994 | Minh et al. . |
| 5,585,136 | 12/1996 | Barrow et al. . |
| 5,656,387 | 8/1997 | Barnett et al. . |
| 5,968,673 | * 10/1999 | Aizawa et al. ....................... 428/688 |

OTHER PUBLICATIONS

Selamr de Souza et al.: Reduced–Temperature Solid Oxide Fuel Cell Based on YSZ Thin–Film Electrolyte, *J. Electrochem. Soc.*, L35–L37, vol. 144, No. 3, Mar. 1997.

* cited by examiner

Primary Examiner—Brian K. Talbot
(74) Attorney, Agent, or Firm—Pauley Petersen Kinne & Fejer

(57) ABSTRACT

A method for fabrication of solid ceramic thin films in which a porous or dense supporting substrate is spray coated with an oxide powder/solid suspension to form a coated supporting substrate. The coated supporting substrate is then sintered at an elevated temperature to form a solid ceramic thin film on the supporting substrate.

16 Claims, 2 Drawing Sheets

Ni-YSZ          YSZ          LSM-YSZ

PREPARATION OF CERAMIC THIN FILMS BY SPRAY COATING

BACKGROUND OF THE INVENTION

1. Field of the Invention

This invention relates to a method for fabrication of ceramic thin films, in particular, both dense and porous ceramic thin films, utilizing spray coating. Fabrication of thin (less than or equal to about 10 microns) non-porous (dense) electrolyte layers is a key process in the fabrication of reduced-temperature (less than or equal to about 800° C.) solid oxide fuel cells and other solid state devices. This invention is an economical, scaleable and reliable method for the fabrication of non-porous ceramic films such as electrolyte layers used in solid oxide fuel cells as well as porous ceramic thin films suitable for use in, for example, ultra-filtration applications.

2. Description of Related Art

Practical applications of solid oxide electrochemical devices at temperatures below about 800° C. require a thin film sold electrolyte. Such films are currently produced utilizing a chemical vapor deposition method as taught, for example, by U.S. Pat. No. 5,145,720 to Toshio et al., an electrochemical vapor deposition method as taught by U.S. Pat. No. 4,609,562 to Isenberg et al., and sputter deposition as taught by U.S. Pat. No. 5,656,387 to Barnett et al. Chemical vapor deposition and electrochemical vapor deposition and sputter deposition are limited by long process times and high cost.

A number of additional methods have been used to fabricate oxide thin films at low cost. U.S. Pat. No. 5,085,742 to Dollard et al. teaches a method using thermoplasma spraying of yttria stabilized zirconia on doped lanthanum manganite air electrode tubes to provide an electrolyte layer. However, an additional electrochemical vapor deposition is required in order to fill the pores of the plasma spray coated layer.

U.S. Pat. No. 5,358,735 to Kawasaki et al. teaches a method in which a solid oxide powder is sprayed onto a substrate and then impregnated by a salt solution, thereby filling the pores of the spray coated layer. The thin film is then subjected to a high temperature treatment to improve air tightness of the solid oxide thin film formed on the substrate. The heat treatment temperature is between about 1300–1500° C. dependent upon the composition of the impregnated salt solution.

U.S. Pat. No. 5,585,136 to David et al. teaches a sol-gel process for fabricating solid oxide thin films on a substrate. U.S. Pat. No. 5,368,667 to Minh et al. teaches a calender rolling method and Souza et al., Journal of the Electrochemical Society, Volume 144, No. 3 (1997) reports a method for fabricating yttria stabilized zirconia thin films by dipcoating. The thin films of both of these methods are subjected to a high temperature (1400–1600° C.) sintering for airtightness, but quality control, composition-gradient coatings, surface roughness modification and large coating areas are problematic with these methods.

SUMMARY OF THE INVENTION

It is one object of this invention to provide an inexpensive, low temperature (less than about 1300° C.) sintering fabrication process for producing dense oxide thin films.

It is another object of this invention to provide a method for producing porous ceramic thin films having uniform pore sizes and low fabrication cost, which films are required in a variety of applications such as ultra-filtration and gas separation.

These and other objects of this invention are addressed by a method for fabrication of solid ceramic thin films in which a porous or dense supporting substrate is spray coated with at least one oxide powder/solvent suspension resulting in formation of a coated supporting substrate. The coated supporting substrate is then sintered at an elevated temperature, forming a solid ceramic film on the supporting substrate. Such films are suitable for use in fuel cells, gas permeation membrane reactors, sensors, ultra-filtration and gas separation processes. Dense solid oxide thin films produced in accordance with the method of this invention can be either a homogeneous composition or a gradient composition. For porous thin films produced in accordance with the method of this invention, pore size is controlled by particle size of the oxide powder and sintering temperature. In accordance with one preferred embodiment of this invention, the oxide powder has a particle size in the range of about 0.005 microns to about 2.0 microns.

The solid ceramic film produced in accordance with the method of this invention has a thickness in the range of about 0.5 microns to about 50 microns, more particularly in the range of about 2.0 microns to about 15.0 microns.

The temperature at which the coated supporting substrate is sintered is in the range of about 300° C. to about 1600° C. In order for the ceramic thin film to be porous, the sintering temperature is preferably in the range of about 300° C. to about 1100° C. In order to densify the ceramic thin film so as to form a substantially non-porous thin film, the coated supporting substrate is preferably sintered at a temperature in the range of about 1000° C. to about 1600° C.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
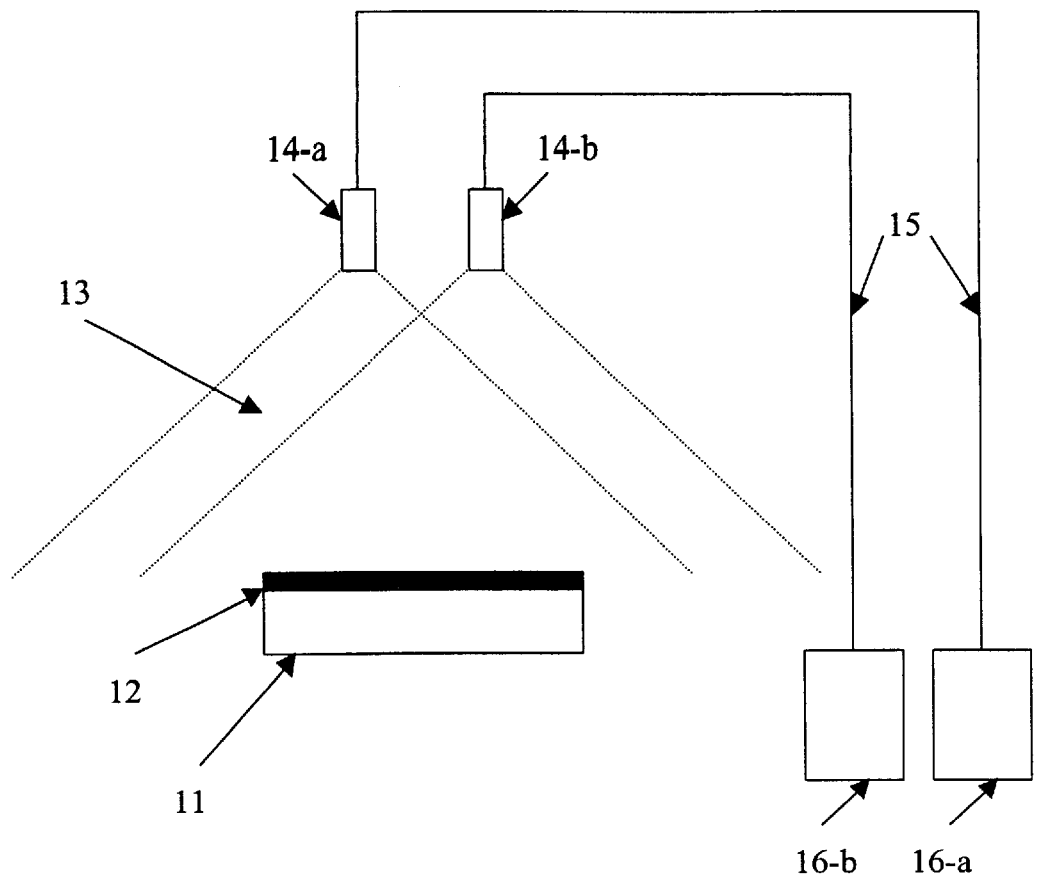
FIG. 1 is a schematic diagram of a spray coating system.
Figure 2:
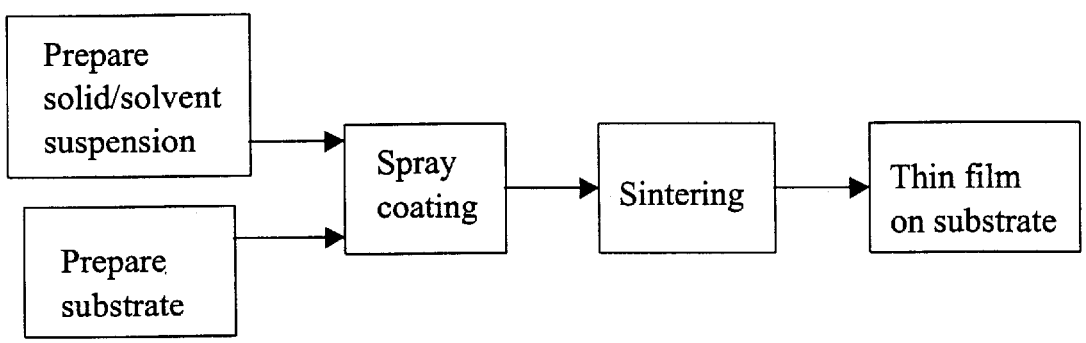
FIG. 2 is a process flow diagram for the method of this invention.

FIG. 1 is a schematic diagram of a spray coating system for use in the method of this invention and FIG. 2 shows a flow diagram for the method of this invention. In accordance with the method of this invention, ceramic powder/solvent in suspensions indicated by reference numerals 16-a and 16-b are first prepared in a high-intensity mixer or ultrasonic processor. The ceramic (oxide) powder can be any composition or mixture of compositions that are stable in the solvent. In accordance with a preferred embodiment of this invention, the ceramic powder (oxide powder) is a multi-metal component oxide. In accordance with a particularly preferred embodiment of this invention, the oxide powder is a ceramic powder selected from the group consisting of stabilized zirconia, ceria, alumina and combinations thereof. Suitable solvents are water, organic solvents and mixtures thereof. Preferred solvents include, but are not limited to, water, methanol, ethanol, and propanol. Provided the ceramic powder/solvent suspension is stable during the process of coating and drying, the addition of a dispersant to the suspension is not required.

As previously indicated, the properties of the ceramic thin film produced in accordance with the method of this invention vary in part depending upon the particle size of the ceramic powder. Preferably, the particle size of the ceramic powder should be a fraction of the desired thickness of the thin film designated by reference numeral 12. For example, if the oxide thin film 12 is to be 3 micrometers, all of the particles of the ceramic powder should be smaller than about 0.6 micrometers. In accordance with a particularly preferred embodiment of this invention, the particle size of the ceramic powder is less than about 2 microns and is preferably in the range of about 0.005 microns to about 2.0 microns.

The concentration of ceramic powder in the oxide powder/solvent suspension is selected for optimal processing. Preferably, the solid concentration is in the range of about 0.01% to about 5% by volume of the suspension with the remainder of the suspension being solvent with or without dispersant. A low solid concentration maintains stability of the suspensions and avoids particle agglomeration in the suspensions and during the coating process.

The substrate, designated as reference numeral 11, can be either planar or tubular. Spray nozzles 14-a and 14-b may be air atomizing spray nozzles, airless spray nozzles, ultrasonic spray nozzles, or static spray nozzles. The spray drop designated by reference numeral 13 size should be substantially uniform and small. The preferable spray drop size is in the range of about 5 to about 500 micrometers.

The number of spray nozzles 14-a and 14-b used in the process of this invention depends upon the size of substrate 11 and the composition of thin film 12. In the case of single composition thin films, suspension 16-a and 16-b supplied to the nozzles through pipeline 15 have the same composition. For composition gradient thin films, the compositions of ceramic powder in the suspensions 16-a and 16-b are different. The final composition and compositional gradient are determined by the spraying fluid rate ratio of different suspensions 16-a and 16-b.

The preferred coated thin film produced in accordance with the method of this invention has uniform thickness and, compared to thin films produced by conventional processes, less agglomeration between the particles. Depending on the sintering temperature, the method of this invention produces thin films which may be dense or porous without cracking and pinholes. The sintering temperature is highly dependent upon the composition and particle size of the ceramic powder. We have found that coating a substrate with a submicron yttria stabilized zirconia (YSZ) powder and sintering it at a temperature in the range of about 1100° C. to about 1600° C., more preferably, at a temperature less than about 1300° C. in air, produces a dense (greater than 95%) thin film. In contrast thereto, substrates coated with submicron yttria stabilized zirconia powder and sintered at a temperature in the range of about 300° C. to about 1100° C. produces a porous thin film having substantially uniform pore size.

After sintering of the coated supporting substrate, the resulting thin film/substrate bi-layer 5 is suitable for use in the fabrication of devices such as fuel cells, gas permeation membrane reactors, sensors, ultra-filters and gas separators.

EXAMPLE 1

This example describes the fabrication of a dense YSZ thin film on a NiO-YSZ planar substrate in accordance with one embodiment of the method of this invention.

(a) Powder mixtures of NiO and 8% yttria stabilized zirconia having a weight ratio of 50/50 are ball milled in water for 24 hours with a small amount of dispersant. After separation of the balls from the slurry, the desired amount of binders is added to the slurry which is stirred to mix the binders and the powders. After stirring for more than six hours, the slurry is tapecast and dried in air. The final thickness of the substrate is controlled by the casting. The preferable thickness is between about 50 and about 500 micrometers. After the substrate is completely dried, the green tape is cut to the desired shape and size. The binders are then burned out at about 300–400° C. and the substrates are further annealed at a temperature of about 1000–1100° C.

(b) A mixture of YSZ powder in water is disrupted using an ultrasonic liquid processor for 30 minutes to prepare a stable YSZ/water suspension. More water is added as needed to adjust the solid concentration of the suspension to about 0.2% by volume.

(c) The initial weight of the substrate is then recorded and the suspension is slowly sprayed onto the substrate surface using an air atomizing spray nozzle. The spray rate is carefully controlled such that the spray drops spread and dry immediately on the substrate surface. By checking the weight of the coated substrate and comparing it to the initial weight value, the amount of YSZ deposited on the substrate can be determined. Spraying the substrate and checking the coated substrate weight is performed until the desired amount of YSZ powder has been deposited.

(d) The coated thin film/substrate is sintered at 1400° C. for four hours and cooled down slowly (2° C./min) to release the tension due to the mismatch of coefficient of thermal expansion (CTE) between the thin film and the substrate. At this point, the dense YSZ/NiO-YSZ bi-layer is ready.

Figure 3:
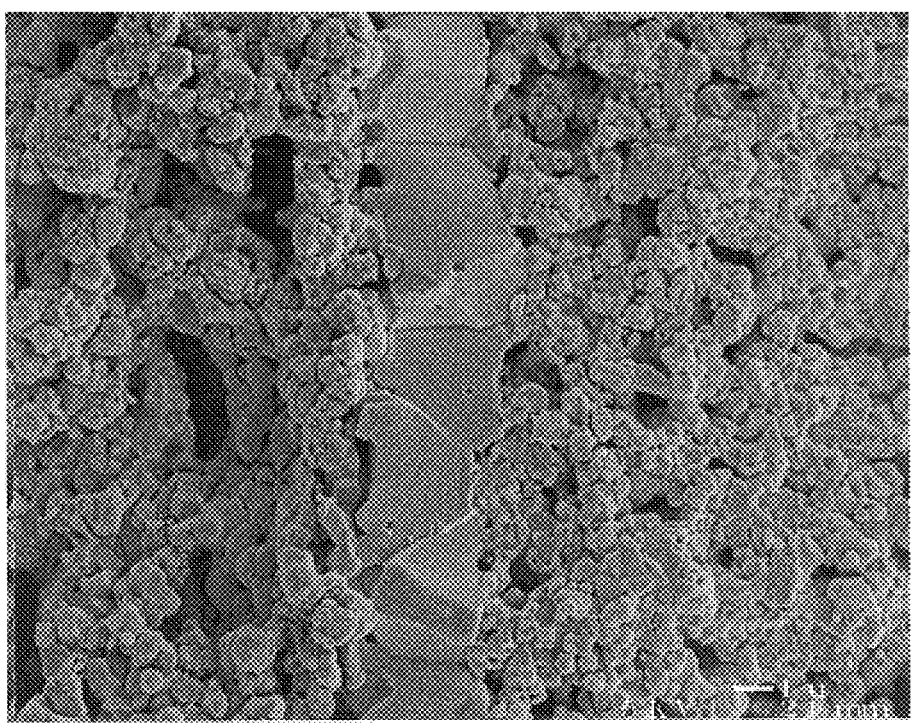
FIG. 3 is a scanning electronic micrograph showing a YSZ electrolyte thin film between a Ni-YSZ substrate and a LSM-YSZ cathode of a solid oxide fuel cell.

(e) A layer of LSM-YSZ slurry can be screen printed on the top of the YSZ thin film and then sintered at a temperature of about 1250° C. for one hour. After reducing NiO to Ni, the Ni-YSZ/YSZ/LSM three-layer fuel cell is ready for testing. The microstructure of the three-layer cell can be observed by a scanning electron microscope (SEM). A SEM micrograph of a three-layer cell is shown in FIG. 3.

EXAMPLE 2

This example describes the fabrication of YSZ on a LSM-YSZ planar substrate. The steps are the same as steps (a)–(d) of Example 1 except that the NiO powder is replaced with $La_xSr_{1-x}MnO_3$ (LSM) powder, where x is in the range of about 0.05 to about 0.40, and the sintering temperature is 1250° C. instead of 1400° C.

EXAMPLE 3

This example describes the fabrication of YSZ on LSM-YSZ tubular substrates. The process in Example 2 is repeated except that the tapecast LSM-YSZ planar substrate is replaced with a LSM-YSZ or LSM-CSZ (calcia stabilized zirconia) tube.

EXAMPLE 4

Figure 4:
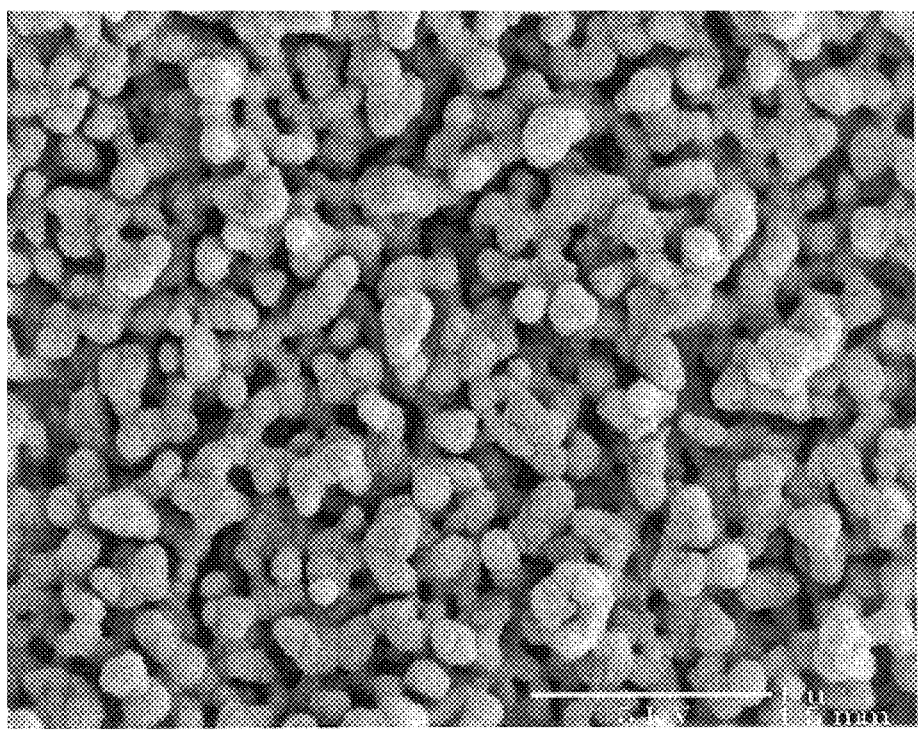
FIG. 4 is a scanning electronic micrograph showing a porous YSZ thin film produced in accordance with the method of this invention having uniform pore sizes.

This example describes fabrication of a porous YSZ thin film. In accordance with this example, the method of Example 1 is employed except that the NiO-YSZ mixture is replaced with YSZ or alumina and the sintering temperature is below 1100° C. The surface morphology of the porous YSZ film is shown in FIG. 4.

EXAMPLE 5

This example describes fabrication of other porous thin films in accordance with the method of this invention. The steps of Example 4 are employed except that YSZ is replaced by single metal oxide powders such as ceria, alumina and silica.

As previously stated, the method of this invention provides an economic, scaleable and reliable method for the fabrication of non-porous ceramic thin films such as the electrolyte layers used in solid oxide fuel cells. A yttria-stabilized zirconia thin-film electrolyte was prepared by spray coating a YSZ/solvent (water and/or alcohol) suspension onto a NiO-YSZ substrate. The YSZ thin-film was densified after sintering at an elevated temperature. The open circle voltage of the resulting YSZ thin-film electrolyte cells ranged from 1.08 to 1.10 V at 800° C. when $H_2$-3% $H_2O$ was the fuel environment and air was the oxidizing environment. This indicates that the YSZ electrolyte is dense and that gas leakage through the electrolyte is negligible. The thin-film electrolytes appeared dense and uniform under 5000 magnification in the scanning electron microscope, as shown in FIG. 3.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for fabrication of solid ceramic thin films comprising the steps of:

spray-coating one of a porous supporting substrate and a dense supporting substrate with at least one oxide powder/solvent suspension comprising in a range of about 0.01% to about 5% by volume of said at least one oxide powder, forming a coated supporting substrate; and sintering said coated supporting substrate at an elevated temperature, forming a solid ceramic film on said supporting substrate.

2. A method in accordance with claim 1, wherein said solid ceramic film has a thickness in a range of about 0.5 microns to about 50 microns.

3. A method in accordance with claim 1, wherein said solid ceramic film has a thickness in a range of about 2.0 microns to about 15.0 microns.

4. A method in accordance with claim 1, wherein said solvent is selected from the group consisting of water, organic solvents and mixtures thereof.

5. A method in accordance with claim 4, wherein said organic solvent is an alcohol selected from the group consisting of methanol, ethanol and propanol and mixtures thereof.

6. A method in accordance with claim 1, wherein a concentration of said oxide powder in said suspension is in a range of about 0.1% to about 1.0% by volume.

7. A method in accordance with claim 1, wherein said sintering temperature is in a range of about 300° C. to about 1600° C.

8. A method in accordance with claim 7, wherein said sintering temperature is in a range of about 300° C. to about 1110° C.

9. A method in accordance with claim 7, wherein said sintering temperature is in a range of about 1000° C. to about 1600° C.

10. A method in accordance with claim 8, wherein said solid ceramic film is a porous thin film.

11. A method in accordance with claim 9, wherein said solid ceramic film is a dense thin film.

12. A method in accordance with claim 1, wherein said oxide powder has a particle size in a range of about 0.005 microns to about 2.0 microns.

13. A method in accordance with claim 1, wherein said oxide powder is one of a single metal and a multi-metal component oxide.

14. A method in accordance with claim 13, wherein said oxide powder is a stabilized oxide selected from the group consisting of zirconia, ceria, alumina and combinations thereof.

15. A method in accordance with claim 13, wherein said oxide powder is selected from the group consisting of ceria, alumina, silica and combinations thereof.

16. A method in accordance with claim 1, wherein said substrate is spray coated with a plurality of said oxide powder/solvent suspensions, forming a composition gradient material.

* * * * *